United States Patent
Hullett et al.

(10) Patent No.: US 6,411,627 B1
(45) Date of Patent: *Jun. 25, 2002

(54) SWITCHING PROTOCOL PROVIDING CONTROLLED ACCESS TO AVAILABLE ASYNCHRONOUS NETWORK SERVICE

(75) Inventors: John Leslie Hullett, Daglish; Antonio Cantoni, City Beach; Zigmantas Leonas Budrikis, Dalkeith; Vaughan William Wittorff, Bunbury, all of (AU)

(73) Assignee: Curtin University of Technology, Bentley (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/776,237
(22) PCT Filed: Jul. 25, 1995
(86) PCT No.: PCT/AU95/00451
§ 371 (c)(1),
(2), (4) Date: Mar. 13, 1997
(87) PCT Pub. No.: WO96/03824
PCT Pub. Date: Feb. 8, 1996

(30) Foreign Application Priority Data

Jul. 25, 1994 (AU) .............................. PM 6993

(51) Int. Cl.⁷ .......................... H04L 12/28; H04L 12/26
(52) U.S. Cl. ....................... 370/398; 370/229; 370/415; 709/229
(58) Field of Search ................. 370/229–230, 370/231–232, 233–234, 235–238, 395, 359, 360, 389, 398, 411, 412, 413, 414, 415, 416, 417, 418, 419, 422, 428, 440; 395/200.7, 200.74, 200.13; 709/229, 232, 233, 225

(56) References Cited

U.S. PATENT DOCUMENTS

| 4,475,192 | A | * | 10/1984 | Fernow et al. | 370/232 |
| 5,233,606 | A | * | 8/1993 | Pashan et al. | 370/418 |
| 5,396,491 | A | * | 3/1995 | Newman | 370/422 |

(List continued on next page.)

FOREIGN PATENT DOCUMENTS

| AU | 57230/94 | 6/1994 | | |
| WO | WO 9319551 | * | 9/1993 | 12/56 |

OTHER PUBLICATIONS

Kung, The FCVC proposal for ATM networks; IEEE, pp. 116–127, 1993.*
IEE Proceedings Part 1, Communications, Speech and Vision (ISSN:0956-3776) v 140 pp. 285–90 Aug. 1993 "Performance analysis of a dynamic priority scheduling method in ATM networks", Huang, T.–Y; Wu, J–L.C.
Patent Abstracts of Japan JP, 07079255 A Toshiba Corp, Mar. 20, 1995.

*Primary Examiner*—Wellington Chin
*Assistant Examiner*—Steven Nguyen
(74) *Attorney, Agent, or Firm*—Larson & Taylor, PLC

(57) ABSTRACT

A method of controlling the flow of traffic in synchronous transfer mode (ATM) network (10), which brings into possible existence a class (class II) of ATM cells. The ATM network (10) comprises one or more ATM switches (14) coupled by links (20) providing communication channels between the ATM switches (14). The method subjects the class II cells received at an input port of a particular ATM switch (14) to control, originating within the switching element of that ATM switch. The method allows only up to a fixed number of class II cells from a particular input port to be in the switch awaiting onward transfer. Although the control is on class, it nonetheless tends to produce fairness in service among different connections.

10 Claims, 3 Drawing Sheets

U.S. PATENT DOCUMENTS

| | | | | |
|---|---|---|---|---|
| 5,432,824 A | * | 7/1995 | Zheng | 370/235 |
| 5,448,559 A | * | 9/1995 | Hayter et al. | 370/398 |
| 5,457,687 A | * | 10/1995 | Newman | 370/232 |
| 5,463,620 A | * | 10/1995 | Sriram | 370/412 |
| 5,463,622 A | * | 10/1995 | Keller et al. | 370/412 |
| 5,475,682 A | * | 12/1995 | Choudhury et al. | 370/412 |
| 5,493,566 A | * | 2/1996 | Ljengberg | 370/230 |
| 5,521,916 A | * | 5/1996 | Choudhury et al. | 370/414 |
| 5,537,400 A | * | 7/1996 | Diaz | 370/412 |
| 5,541,912 A | * | 7/1996 | Choudhury et al. | 370/412 |
| 5,546,389 A | * | 8/1996 | Wippenenbeck et al. | 370/412 |
| 5,583,861 A | * | 12/1996 | Holden | 370/395 |
| 5,633,867 A | * | 5/1997 | Ben-Nun et al. | 370/399 |
| 5,734,825 A | * | 3/1998 | Lauck | 709/232 |

* cited by examiner

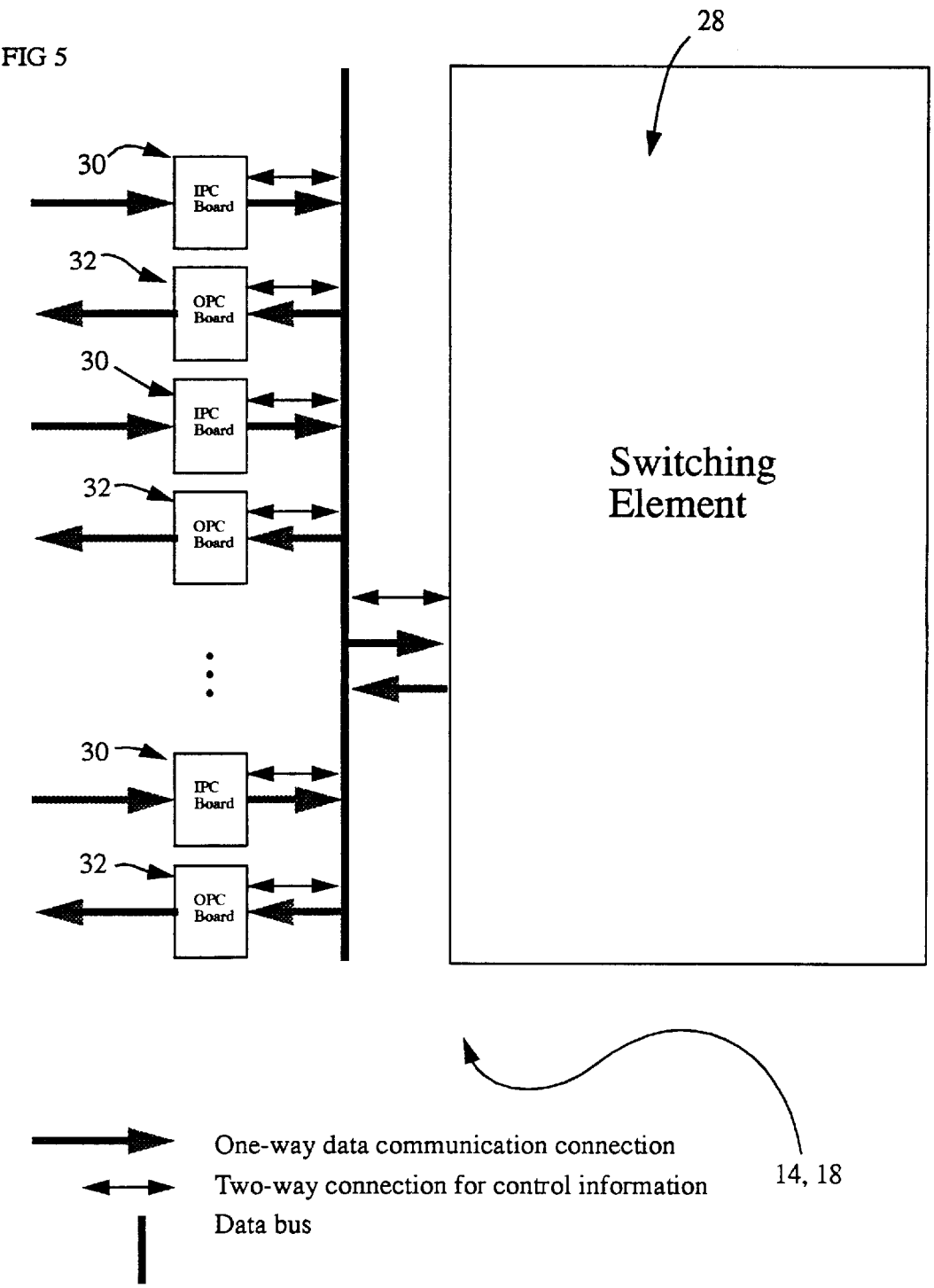

SWITCHING PROTOCOL PROVIDING CONTROLLED ACCESS TO AVAILABLE ASYNCHRONOUS NETWORK SERVICE

FIELD OF THE INVENTION

This invention is in the field of digital asynchronous transfer mode (ATM) networking. It is related to network capability and network utilization and is of a switching method for realizing a specific capability.

BACKGROUND OF THE INVENTION

One class (Class I) of ATM connections, already known through the Recommendations of the International Telecommunications Union (ITU), in relation to the Broadband Integrated Services Digital Network, and the Specifications of the ATM Forum, is that for which specific per connection resource provisions, in terms of bandwidth and switch-buffer allocation, are made and on which delivery is assured in occurrence and in specified or lesser time. Bandwidth or rate descriptors already recommended for Class I connections by the ITU or ATM Forum are Peak Cell Rate and Sustained Cell rate. The other class (Class II), brought into possible existence by our invention, is of ATM connections for which no specific, per connection, resource provisions are made, on which delivery is assured in occurrence and assurance on time of delivery is in a statistical sense only, and which are subject to control, originating within the switching element of the switch, which control is based only on the aggregate switch buffer utilization of the Class's traffic.

An example of an ATM switch which can support Class I connections is the Prelude switch of France Telecom CNET (e.g. J.-P. Coudreuse and M. Servel "Prelude—an asynchronous time-division switched network". ICC'87, Seattle, 1987; French Patent no 82 22 226, Dec. 29, 1982 "Systeme de Commutation de paquets synchrones de longeur fixe", Publication no 2 538 976).

The Prelude is a 16 port switch, switching at 260 Mbps rate. Writing from each input port is effectively in turn, with cells being written into consecutive locations of a (circular) buffer. The pointer to each written-in cell is placed into the FIFO stack(s) of the one (or more) output(s) that is (are) meant to receive it. The reading is also effectively in turn by each output port, taking the next cell pointer from its FIFO stack and outputting the pointed cell. The fill of a FIFO stack at a given time represents the backlog of cells still to be read by the given output port. The capacity of a FIFO stack could typically be for, say, 50 pointers. To accommodate the worst case, the capacity of the (circular) buffer would be for 50×16=800 cells.

The Prelude switch can switch only 'resourced' connections, or what we here call Class I ATM connections. The connections are resourced in the sense that all connections $C_{ijk}$, where subscript i signifies that the connection enters on input port i, subscript j signifies that it is to be switched to output port j, and k signifies that it is the k-th connection that goes from i to j, have individual peak cell rate limits $r_{ijk}$ such that $$\sum_i \sum_k r_{ijk} < R_j(1-m) \qquad (EQ\ 1)$$

where $R_j$ is the maximum rate at which cells can be output by port j, and m is a safety margin. The size of the safety margin depends on the number of connections, the capacity of the FIFO stack, and the magnitude of the tolerable probability that the stack should overflow. A typical size of margin would be 0.15, corresponding to a tolerable probability of overflow of less than $10^{-13}$.

We note that with service for Class I ATM connections only, the total network capacity is per force underutilized, minimally by the extent of the safety margin. A potentially much larger underutilization will be associated with the observation that a large proportion of the connections will not at all times, or continually send cells into the network at their given peak rates $r_{ijk}$, but instead exhibit random intervals of inactivity. The average cell flow $\mu_{ijk}$ on $C_{ijk}$ will in a significant percentage of cases be much smaller than $r_{ijk}$, and in consequence $$\sum_i \sum_k \mu_{ijk} < \sum_i \sum_k r_{ijk} < R_j(1-m) \qquad (EQ\ 2)$$

All the capacity that cannot be, or is not utilized, is wasted. With a measure of foresight, it has been called 'available capacity'. As explained in greater detail below, an embodiment of the present invention has the effect of making the 'available' capacity in fact available.

SUMMARY OF THE INVENTION

It is an object of the present invention to provide a method of switching in an ATM network which, when used in conjunction with known methods of dynamic flow control on the network links, gives the network the capability of supporting two classes of ATM connections.

The dynamic flow control on the network links applies only to traffic cells on Class II connections and is credit based. Within Class II, control is exercised on the whole class of cells rather than on a per connection basis within the class. Class II cells may only be transmitted for which transmit credits are available. Credit(s) is (are) returned to the transmit end of the link, to replenish those available at initialization, whenever a Class II cell is read into the switching element of the switch from the Input Port Controller (IPC) Board. Return of credits is made possible by the assumption that the links comprise two-way pairs of unidirectional elements with one element in each direction.

An embodiment of the switching method, by the switching element of the switch, is by immediate transfer to a common shared memory of every traffic cell offered to the switching element by the IPC Board, and appendance of a pointer (pointing to that cell), to the Class I or Class II queue (as appropriate) for the output port(s) for which the cell is destined. These queues form part of the switching element. At a read-out opportunity for an output port, pointers are read from the Class I queue in first-in-first-out (FIFO) order at link rate, they are read from the Class II queue also in FIFO order and at link rate, but only while the Class I queue is empty and the Output Port Controller (OPC) will accept a Class II cell. A signal from the OPC to the switching element, indicating it cannot accept a Class II cell, implies that the output port has exhausted its supply of credits. Given a pointer, the cell is read from the pointed location, and output to the OPC Board.

When a cell has been read by an output, or in the case of a multicast cell when it has been read by all concerned outputs, its location is returned to the pool of free shared memory locations. With each input port there is associated a Backlog number, being the number of Class I cells resident in the shared memory which were received into the switch by that input port. While that Backlog number is at or above the quota value for that input, the switching element sends a Stop signal to the IPC Board in every cell period, by which the IPC controls the transferral of Class II cells from the IPC Board to the switching element.

Alternative embodiments of the invention exist—one such embodiment is similar to the embodiment described above, but lacks a common shared memory within the switching element of the switch. Instead, cells which are accepted by the switching element are transferred physically to the appropriate FIFO output queues, which hence are queues of cells, rather than of pointers. In this alterative embodiment the Backlog number associated with an input port is the total number of cells in the Class II FIFO output queues which were received into the switch by that input port Whether all copies or only one copy of any multicast cells are counted in the Backlog number is optional.

The maintenance of two classes of switch queues, with absolute service priority for Class L at output ports, and the keeping of Backlog number and quota value for input ports are of key significance to the embodiment of the invention. Separation of queues makes service and service quality on Class I connections independent of traffic on Class II connections, and queueing specifically at output makes the service quality the best possible for any given traffic shape and intensity and the service capacity available to Class II the maximum possible. Application of Stop control on the basis of traffic backlog makes it possible to prevent loss by buffer overflow. Further, making the Stop control for each input port independent, and with a limit on backlog associated with that input, allows for fair sharing among all inputs of the available Class II service capacity. The invention provides a per-class control which offers per-connection fairness.

At an abstract level, the method may be viewed as embodying some principles in common with the distributed queueing protocol (e.g. described by John L. Hullett and Robert M. Newman in "Queueing Protocol". U.S. Pat. No. 4,922,244, May 1, 1990) and with staged queueing (e.g. described by Zigmantas L. Budrikls, Antonio Cantoni, and John L. Hullett in "Distributed Queue Dual Tree Digital Network" (DQDT), AIPO PCT/AU94/00XXX, Jun. 30, 1994). Whereas in these antecedents service is in each case by an implicit single server, in the method described here it is by explicit multiple dedicated servers. But similar to the antecedents, the service is regular FIFO with limited participation in the queues, and backpressure control ensuring loss-free, minimum latency transfer.

Also similar to principles in the extended queue protocol described by Zigmantas L. Budrikis et al. (loc. cit.), the service may in all instances be of two queues at different priorities, where participation in the queues of the higher priority is limited by negotiated peak rates, ex source, on individual ATM connections, and is not subject to the backpressure control. With the extended queue discipline, transfers at the higher priority have guarantees of bandwidth and of limit on delay.

The shared memory ATM switch that, in concert with other switches with identical function and terminals with analogous control functionality, can implement the method of our invention, will have a memory that is notionally partitioned into separate areas (quotas), one area for each input port It will have two FIFO queues associated with each output port, a FIFO queue for Class I and a FIFO queue for Class II. Cell write-in opportunities will occur periodically for all inputs, and cell read-out opportunities will occur periodically for all outputs. The ATM level protocol information will include a Stop_bit, by which flow control will be exercised on a luck-by-link basis.

The backpressure control applies to the aggregated traffic on Class II connections into each input port, based on obtained service from outputs for its onward disposal. Let the traffic intensity on Class II connections arriving at input port i for transmission tort port j be $\rho_{ij}$. The total Class II traffic at input port i is $$\sum_j \rho_{ij},$$

while the total traffic offered to output port j is $$\sum_i \rho_{ij}.$$

Assuming sufficiently large quotas and statistically stable traffic flows, the switch would forward all traffic without exercising Stop control at any of the inputs if, and only if, for all j $$\sum_i \rho_{ij} < \left( R_j - \sum_i \sum_k \mu_{ijk} \right) = A_j \qquad \text{(EQ 3)}$$

where $A_j$ is the available capacity at output port j.

In reality it must be expected that the inequality (EQ 3) will not hold for all outputs, and that Stop control will be exerted at one or more input ports. The effect of the control is to modify the aggregate traffic on Class II connections into input port i by multiplication by a factor $g_i$, $0 < g_i \leq 1$, so that for all j $$\sum_i g_i \rho_{ij} < A_j \qquad \text{(EQ 4)}$$

For the special case when the traffic intensities and available capacities are constants, that is all flows are at constant bit rates and the available capacities are fixed over an extended duration of time, the factors $g_i$ can be found simply from equilibrium conditions. For instance, consider the case where up to time t=0 EQ 3 held for all j, and at t=0 one or more of the traffic flows or of the available capacities changed to new constants so that the inequalities of EQ 3 still holds for all but one particular output $j_0$. Then the aggregate flows would potentially be down-sized only in those inputs that send any traffic to $j_0$, and of these, assuming that all inputs have equal and adequate quotas, only those that contribute more than their fair share of the traffic to $j_0$.

Pursuing the example further, the input ports are ranked in ascending order with respect to their traffic to output $j_0$. The total of n inputs are divided into two groups, the "under fair-share" group of m inputs for which $$\sum_{i=1}^{m} \rho_{ij_o} \leq A_{j_o} - (n-m)\rho_{mj_o} \qquad \text{(EQ 5)}$$

$$\text{and } \sum_{i=1}^{m+1} \rho_{ij_o} > A_{j_o} - (n-m-1)\rho_{(m+1)j_o} \qquad \text{(EQ 6)}$$

and the "over fair-share" group of the remaining (highly ranked) n−m inputs. Then, dictated by equilibrium, $$g_i = \begin{cases} 1 & i = 1, 2, m \\ \dfrac{A_j - \sum_{i=1}^{m} \rho_{ij}}{(n-m)\rho_{ij}} & i = m+1, \ldots n \end{cases} \quad \text{(EQ 7)}$$

where the dummy variable t has been used in place of i as the first subscript in the summation, and still designates the input port.

Consider a numerical example of a 5×5 switch, designated as switch S, and having $A_j=10$, for all j, and a stable traffic matrix for t<0

$$\rho_{ij}(t<0) = \begin{bmatrix} 0 & 2 & 2 & 1 & 3 \\ 1 & 0 & 2 & 2 & 0 \\ 1 & 2 & 0 & 1 & 1 \\ 3 & 1 & 3 & 0 & 1 \\ 2 & 1 & 2 & 3 & 0 \end{bmatrix}$$

An increase of the offered traffic element $\rho_{23}$ from 2 to 6 at t=0 will results in the unstable traffic matrix $$\rho_{ij}(0) = \begin{bmatrix} 0 & 2 & 2 & 1 & 3 \\ 1 & 0 & 6 & 2 & 0 \\ 1 & 2 & 0 & 1 & 1 \\ 3 & 1 & 3 & 0 & 1 \\ 2 & 1 & 2 & 3 & 0 \end{bmatrix}.$$

that at initial equilibrium at the switch produces $g_2=0.5$, and the matrix $$\rho_{ij}(t<0) = \begin{bmatrix} 0 & 2 & 2 & 1 & 3 \\ 0.5 & 0 & 3 & 1 & 0 \\ 1 & 2 & 0 & 1 & 1 \\ 3 & 1 & 3 & 0 & 1 \\ 2 & 1 & 2 & 3 & 0 \end{bmatrix}$$

If the link terminating in port 2 in the above example is to another switch, say switch T, then, by the reduction of traffic on the link to port 2 of Switch S, the traffic at switch T is made unstable and subsequently is made stable by similar reduction of the major input tributary or tributaries to that output link. The process of flow reduction by Stop control continues backward through the switches until it reaches the primary source or sources of the excess traffic, originating in one or more terminals. If all primary traffic flows, except the primary flow(s) reduced by the Stop control that propagates from switch S, remain at the same values as at t=0, then with high probability the traffic flows into input port 2 of S that go to other than output port 3 are restored in time to their values at t=0.

The final stable traffic matrix at switch S is with high probability $$\rho_{ij}(t \to \infty) = \begin{bmatrix} 0 & 2 & 2 & 1 & 3 \\ 1 & 0 & 3 & 2 & 0 \\ 1 & 2 & 0 & 1 & 1 \\ 3 & 1 & 3 & 0 & 1 \\ 2 & 1 & 2 & 3 & 0 \end{bmatrix}$$

While formally the final stable traffic matrix is indicated as occurring in the limit as time approaches infinity, the actual elapsed time before this state is reached can be quite short. It will depend on the size of the quotas, the size of the excess traffic, the number of switching stages back to the primary sources, and the physical lengths of involved links. The time to final stability will be shorter in direct proportion, the larger the excess traffic. But it will be made longer, also in direct proportion, the larger the quotas, the greater the number of switching stages, and the larger the physical lengths of involved links.

Nothing or very little can be done about physical lengths or the number of switching stages. Quota size is the only design parameter. To achieve rapid response, it should be small: to achieve maximum fairness in service to inputs, it should be large. Ultimately, both considerations are related to performance, and the quotas should be chosen so as to achieve optimum performance. To do this, a better understanding of Class II traffic characteristics will be required than is now available. As yet only indicative pointers can be made.

Differences in the values assigned as quotas for the input ports on a particular switch are significant as a factor in the sharing among input ports of the available forwarding capacity, and may be used to this end. If all input ports have equal quotas, the sharing in available capacity will, at least approximately, be also equal. If one input port is allocated a larger quota than others, then it will, again approximately, claim a proportionally larger percentage of available capacity. The larger the memories, in absolute terms, the closer these approximations, but at the same time the less the dynamic agility in the control to push back the necessary rate adjustments to the originating sources and thereby maximize the total network throughput.

The consideration of fair apportionment among inputs of available service by outputs, is similarly problematical. Fair apportionment, coupled to rapid push-back of control to primary sources, will give the best utilization of available capacity. For the special case of traffic flows composed of constant rate tributaries, only little memory is required to ensure fair apportionment. An amount, in numbers of cells, of the order of $n^2$, where n is the number of ports on the switch, will be more than sufficient. However, in practice the offered traffic on Class II ATM connections can rarely be expected to be constant; more credibly it must be expected to be random in time and without any stationarity even in a statistical sense. Very large, equally limited memories would in all circumstances ensure fair apportionment over time, but the large memories will make the push-back of control to primary sources slow.

BRIEF DESCRIPTION OF THE DRAWINGS

The invention should become fully apparent when taken in connection with the following detailed description and accompanying drawings in which:

FIG. 5 shows a common memory based ATM switch with Class II service capability

DETAILED DESCRIPTION

Figure 1:
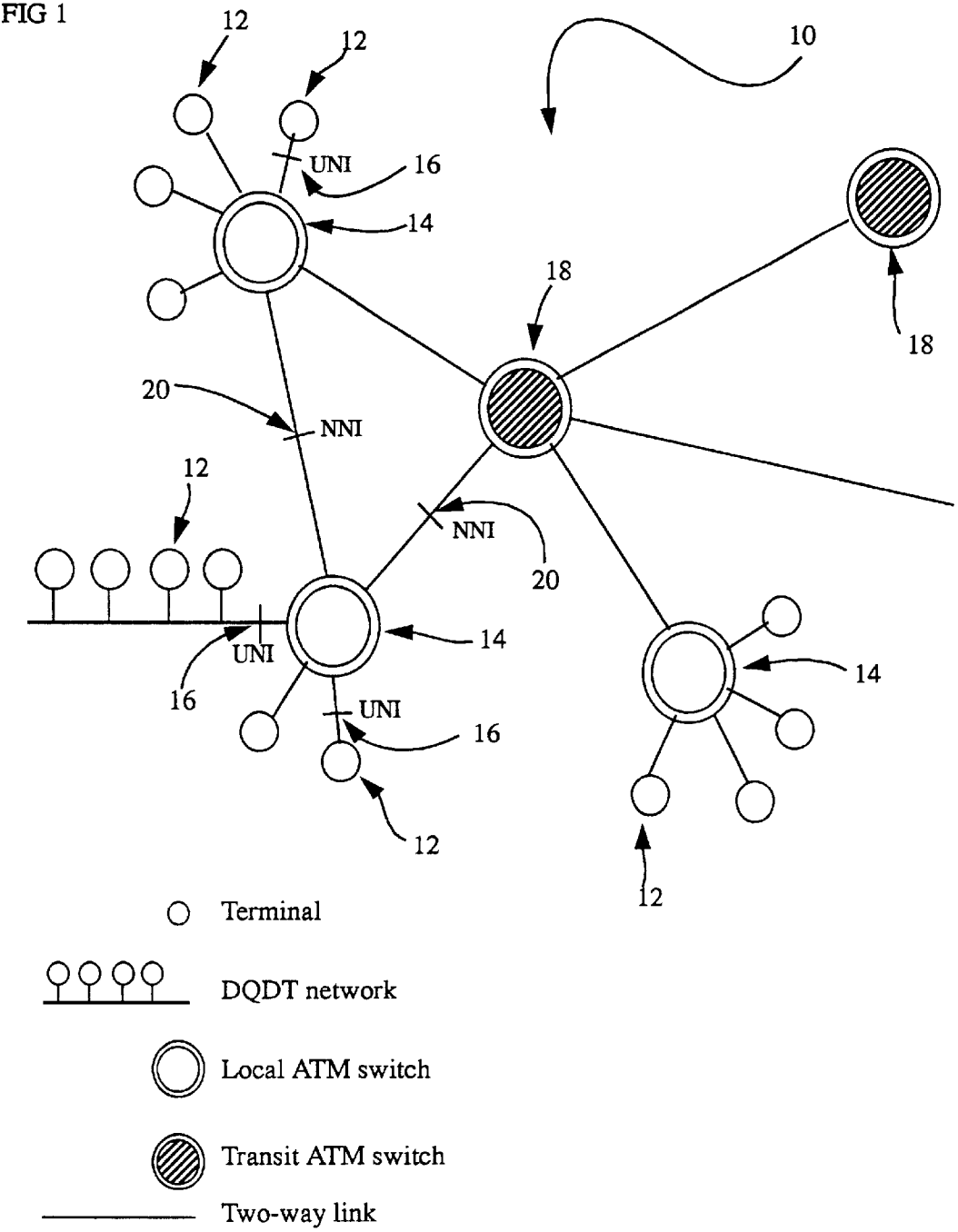
FIG. 1 shows a schematic of a switched ATM network

FIG. 1 shows a notional topological schematic of an ATM network 10. Terminals 12 are shown attached to local switches 14. The attachment of a terminal 12 to a switch 14 is across an open interface known as the user-network interface or UNI 16. Local switches 14 are interconnected over transit switches 18 and may also be interconnected directly to each other. Switch to switch interconnections are across network node interfaces or NNI's 20.

Figure 2:
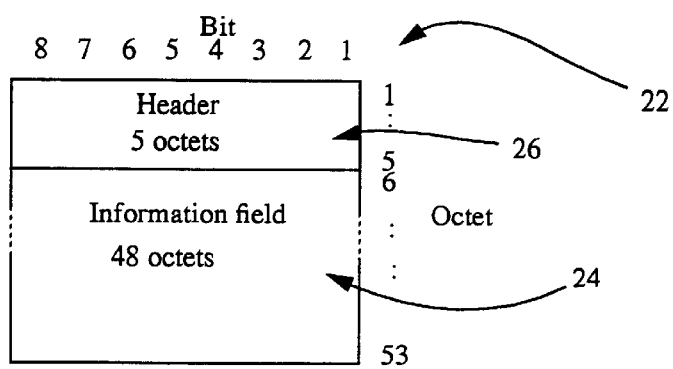
FIG. 2 shows the ATM cell structure
Figure 3:
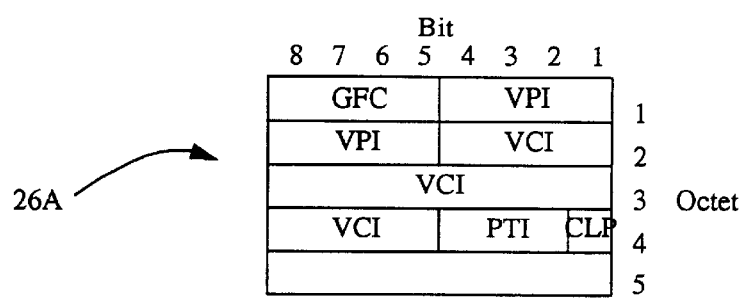
FIG. 3 shows the cell header of the ATM cell illustrated in FIG. 1 at the User-Network Interface, UNI
Figure 4:
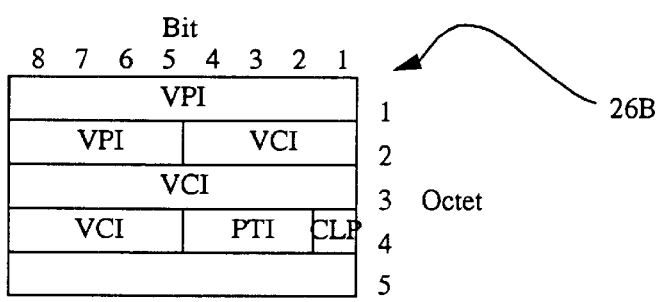
FIG. 4 shows the cell header of the ATM cell illustrated in FIG. 1 at the Network-Node Interface, NNI

With ATM all information to be transferred across the B_ISDN UNI 16 or NNI 20 is packed into fixed sized segments called cells 22. As shown in FIG. 2 these cells 22 have a 48 octet information field 24 and a 5 octet header 26. The ATM cell header block 26 contains the VPI and VCI fields which carry the labels necessary to associate cells 22 belonging to the same Virtual Path and Virtual Circuit respectively. The Virtual Channel describes the unidirectional flow of ATM cells 22 marked by a unique identifier, carried in the cell header 26, called the Virtual Channel Identifier (VCI) and belonging to Virtual Paths associated by a common unique identifier, carried in the cell header, called the Virtual Path Identifier (VPI). Virtual Channels are transported within Virtual Paths which are used to aggregate Virtual Channels. FIGS. 3 and 4 show the location and size of these VCI/VPI fields for the respective UNI 16 and NNI 20.

FIG. 3 shows that a four-bit Generic Flow Control (GFC) field exists in the cell header 26A at the UNI 16, and this can be used as described in ITU Recommendation L371 to distinguish between Class I (uncontrolled) and Class II (controlled) cells. This Recommendation provides for up to two separate Groups of Class II connections, and the realizations in this patent therefore appear in two forms—one of which supports only one Group of Class II connections, and the other which supports both.

FIG. 4 shows that no GFC field exists in the cell header 26B at the NNI 20. One bit of this cell header 26B must therefore be reassigned for the purpose of link-based flow control across the NNI 20. One candidate is the Cell Loss Priority (CLP) bit. The VCI/VPI fields of the cell header are to be used to distinguish Class I (uncontrolled) and Class II (controlled) cells.

The switch 14, 18, shown in FIG. 5, is divided into two sub-elements, one being the switching element 28, and the other containing the IPC (Input Port Controller) Boards 30 and OPC (Output Port Controller) Boards 32. The switching element 28 has several components, as do each of the IPC Boards 30 (comprising an IPC and some cell buffering) and each of the OPC Boards 32 (comprising an OPC and some cell buffering). These components are not shown explicitly in FIG. 5, and their operation will be described only in the context of the operation of the entire sub-element of which they comprise.

Switching Element Realization

An embodiment of the switching element 28 shown in FIG. 5, which is the subject of this application, is given in the form of psuedocode listings. Listing 1 is for a switch which supports only one group of Class II connections. whilst Listing 2 is for a switch which supports two such groups of Class II connections.

Listing 1:

```
#define SET 1
#define RESET 0
process_switch_a( )
/* PSEUDOCODE */
/* SWITCHing process implementing AccessII traffic management protocol */
/* Only Group A supported */
/* Version 1.2 May 1995 */
{
        /* The switch has N input ports and N output ports. */
        /* They are numbered 0 . . . N-1 */
    int freemem = TOTAL_MSM;
    /* The variable freemem keeps record of the amount of free memory */
    /* in the switch. It is initialized to TOTAL_MSM, which is the */
    /* total ATM cell capacity of the Main Shared Memory. */
    int cells_lost = 0;
    /* The variable cells_lost keeps record of the number of cells which */
    /* are lost due to memory overflow. It is initialized to zero. */
    Define and initialize stack to contain all addresses of shared memory cells;
    struct mem_type
    {
            octet52 msm; /* For ATM cell, without header checksum */
            struct ssm /* Separate Supplementary Shared Memory */
            {
                    bit con_flag; /* To specify CELL as controlled or not */
                    int in_port_id, multicast_ctr;
            }
    }
    mem_type shared_mem[TOTAL_MSM];
    /* The switch's shared memory is declared here as an array of size */
    /* TOTAL_MSM, with each element of the array being a struct of type */
    /* mem_type, defined above. The struct mem_type consists of 52 */
    /* octets to store an ATM cell (without the header checksum), and */
    /* has associated with it a separate Supplementary Shared Memory */
    /* (SSM). The SSM consists of a flag con_flag which identifies the */
    /* cell as controlled (1) or uncontrolled (0). The SSM also contains */
    /* an in_port_id, which identifies the input port on which the cell */
    /* arrived, and a multicast_ctr, which keeps record of the number of */
    /* times the switch remains to output the cell. */
    int con_input_ctr[N];
    /* This array of variables, one for each input port, keeps record */
    /* of the number of locations in the shared memory occupied by */
```

```
/* controlled cells which arrived on each of the input ports. */
for(int i = 0; i < N; i++)
        con_input_ctr[i] = 0;
/* Initiaiize con_input_ctr[ ]*/
for(int i = 0; i < N; i++) /* For each output part */
{
        Define output queue for uncontrolled connections on output port i;
        Define output queue for controlled connections on output port i;
}
/* In addition, C_Q_occ[i] is a line_out card flag (initialized to */
/* RESET) to indicate that the controlled queue for output port i */
/* in the line_out card is occupied. */
/* C_Q_occ[i] will never be set if output port if uses processes */
/* tx_store_*_uni_ctrlg and transmit_*_uni_ctrlg */
do
{
        for(int i = 0; i < N; i++) /* Process each input in turn */
        {
                LM_Sig(R_Start, con_input_ctr[i] >= QUOTA);
                /* LM_Sig(R_Start, Stop) is layer management signal */
                /* signifying start of cell Relay period. Parameter STOP */
                /* signifies that no cell on controlled ATM connection may be */
                /* sent into Relay/Switch in that Relay period. The QUOTA */
                /* parameter here is common to all input ports, but different */
                /* quotas could be implemented, if desired */
                if (CELL arrives from line_in card)
                {
                        if (freemem > 0)
                        {
                                Pop address off stack into variable addr;
                                freemem--; /* Decrement */
                                Read CELL into shared_mem[addr], msm;
                                shared_mem[addr].ssm.in_port_id:1;
                                if (line_in card designates CELL as from controlled con)
                                /* This information is contained in the GFC field across */
                                /* the UNI, but must be discerned from the VPI/VCI across */
                                /* the NNI. */
                                {
                                    shared_mem[addr].ssm.con_flag - SET;
                                    con_input_ctr[i]++; /* Increment */
                                }
                                else
                                    shared_mem[addr].ssm.con_flag = RESET;
                                Use vector of output queues to which CELL is destined and \
                                    con_flag (provided by line_in card from VPI/VCI) to
                                    latch addr into respective output queues;
                                Initialize shared_mem[addr].ssm.multicast_ctr to one less than \
                                    number of bits set in vector;
                        }
                        else
                        {
                                Discard cell;
                                cells_lost++;
                        }
                }
        }
        for(int i = 0; i < N; i++) /* Process each output in turn */
        {
                int addr = -1;
                if (output queue for uncontrolled cons on port i not empty)
                        Read contents of first-in-queue into addr and remove from queue;
                else
                        if ((output queue for controlled cons on port i not empty) && \
                                    (!C_Q_occ[i]))
                                /* C_Q_occ[i] flag set by LM_Sig(C_Q_occ) from process */
                                /* tx_store_nni and reset by LM_Sig(C_Q_free) from */
                                /* process transmit_nni */
                                Read contents of first-in-queue into addr and remove from queue;
                if (addr != -1)
                {
                        Send CELL at shared_mem[addr] to line_out card;
                        if (shared_mem[addr].ssm.multicast_qtr == 0)
                        {
                                if (shared_mem[addr].ssm.con_flag == SET)
                                        con_input_ctr[shared_mem[addr].ssm.in_port_id]--;
                                Push addr onto address stack;
                                freemem++;
                        }
                        else
```

-continued

```
                shared_mem[addr].ssm.multicast_qtr--;
            }
        }
    } while(1);/* Loop indefinitely */
}
```

Listing 2:

```
#define SET 1
#define RESET 0
process_switch_ab( )
/* PSEUDOCODE */
/* SWITCHing process implementing AccessII traffic management protocol */
/* Groups A & Group B supported */
/* Version 1.2 July 1995 */
{
    /* The switch has N input ports and N output ports. */
    /* They are numbered 0 . . . N-1 */
    int freemem = TOTAL_MSM;
    /* The variable freemem keeps record of the amount of free memory */
    /* in the switch. It is initialized to TOTAL_MSM, which is the */
    /* total ATM cell capacity of the Main Shared Memory. */
    int cells_lost = 0;
    /* The variable cells_lost keeps record of the number of cells which */
    /* are lost due to memory overflow. It is initialized to zero. */
    Define and initialize stack to contain all addresses of shared memory cells;
    struct mem_type
    {
        octet52 msm; /* For ATM cell, without header checksum */
        struct ssm /* Separate Supplementary Shared Memory */
        {
            enum { uncon, con_a, con_b } con_flag;
                /* TO specify CELL's class/group */
            int in_port_id, multicast_ctr;
        }
    }
    mem_type shared_mem[TOTAL_MSM];
    /* The switch's shared memory is declared here as an array of size */
    /* TOTAL_MSM, with each element of the array being a struct of type */
    /* mem_type, defined above. The struct mem_type consists of 52 */
    /* octets to store an ATM cell (without the header checksum), and */
    /* has associated with it a separate Supplementary Shared Memory */
    /* (SSM). The SSM consists of a con_f lag which identifies the */
    /* cell as uncontrolled (uncon), controlled Group a (con_a) or */
    /* controlled Group B (con_b). All controlled cells which arrive */
    /* across an NNI are classified as Group A. The SSM also contains an */
    /* in_port_id, which identifies the input on which the cell */
    /* arrived, and a multicast_ctr, which keeps recoed of the number of*/
    /* times the switch remains to output the cell. */
    int con_a_input_ctr[N];
    int con_b_input_ctr[N];
    /* Each of these array of variables, one for each input port, keeps */
    /* record of the number of locations in the shared memory occupied by */
    /* controlled cells (of the appropriate group) which arrived on each */
    /* of the input ports. Only con_a_input_ctr[ ] is used for input */
    /* ports connected to NNIs. */
    for(int i = 0; i < N; i++)
    {
        con_a_input_ctr[i] = 0;
        con_b_input_ctr[i] = 0;
    }
    /* Initiaiize con_a_input_ctr[ ] and con_b_input_ctr[ ] */
    for(int i = 0; i < N; i++) /* For each output port */
    {
        Define output queue for uncontrolled connections on output port i;
        Define output queue for controlled connections on output port i;
    }
    /* In addition, C_Q_occ[i] is a line_out card flag (initialized to */
    /* RESET) to indicate that the controlled queue for output port i */
    /* in the line_out card is occupied. */
    /* C_Q_occ[i] will never be set if output port ; uses processes */
    /* tx_store_*_uni_ctrlg and transmit_*_uni_ctrlg */
    do
```

```
{
    for(int i = 0; i < N; i++) /* Process each input in turn */
    {
        if (line_in card connects to UNI)
            LM Sig(R_Start, con_a_input_ctr[i] QUOTA, \
                                con_b_input_ctr[i] >= QUOTA);
        else
            LM_Sig(R_Start, con_input_ctr[i] >= QUOTA);
        /* LM Sig(R_Start, Stop_A, Stop_B) and LM_Sig(R_Start, Stop) */
        /* are layer management signals signifying start of cell Relay */
        /* period. Parameter STOP signifies that to cell on controlled */
        /* ATM connection may he sent into Relay Switch in that Relay */
        /* period. Parameters STOP_A and STOP_B signify this separately */
        /* for controlled groups A and B respectively. The QUOTA */
        /* parameter here is common to both controlled groups and all */
        /* input ports, but different quotas could be implemented, */
        /* if desired. */
        if (CELL arrives from line_in card)
        {
            if (freemem > 0)
            {
                Pop address off stack into variable addr;
                freemem--; /* Decrement */
                Read CELL into shared_mem[addr].msm;
                shared_mem[addr].ssm.in_port_id = i;
                if (line_in card designates CELL as from \
                        controlled con of Group A)
                /* This information is contained in the GFC field across */
                /* the UNI, but must be discerned from the VPI/VCI across */
                /* the NNI. */
                {
                    shared_mem[addr].ssm.con_flag = con_a;
                    con_a_input_ctr[i]++; /* Increment */
                }
                else if (line_in card designates CELL as from \
                        controlled con of Group B)
                /* This information is contained in the GFC f ield across */
                /* the UNI. */
                {
                    shared_mem[addr].ssm.con_flag = con_b;
                    con_b_input ctr[i]++;
                }
                else
                    shared_mem[addr].ssm.con_f lag = uncon;
                Use vector of output queues to which CELL is destined and \
                    con_flag (provided by line_in card from VPI/VCI) to \
                    latch addr into respective output queues;
                    /* Note that for each output port there is a */
                    /* single queue for all controlled cells */
                Initialize shared_mem[addr].ssm.multicast_ctr to one less than \
                    number of bits set in vector;
            }
            else
            {
                Discard cell;
                cells_lost++;
            }
        }
    }
}
for(int i = 0; i < N; i++) /* Process each output in turn */
{
    int addr = -1;
    if (output queue for uncontrolled cons in port i not empty)
            Read contents of first-in-queue into addr and remove from queue;
    else
            if ((output queue for controlled cons on port i not empty) && \
                    (!C_Q_occ[i]))
                        /* C_Q_occ[i] flag set by LM_Sig(C_Q_occ) from process */
                        /* tx_store_nni and reset by LM_Sig(C_Q_free) from */
                        /* process transmit_nni */
                        Read contents of first-in-queue into addr and remove from queue;
            if (addr != -1)
            {
                Send CELL at shared_mem[addr] to line_out card;
                if (shared_mem[addr].ssm.multicast_ctr == 0)
                {
                    if (shared_mem[addr].ssm.con_flag == SET)
                            con_input_ctr(shared_mem[addr].ssm.in_port_id]--;
                    Push addr onto address stack;
```

```
                freemem++;
            }
            else
                shared_mem[addr].ssm.multicast_ctr--;
        }
    }
    } while(1); /* Loop indefinitely */
}
```

Alternative embodiments of the switching element exist—one such embodiment is similar to the embodiment described above, but lacks a common shared memory. Instead, cells which are accepted by the switching element 28 are transferred physically to the appropriate FIFO output queues, which hence are queues of cells, rather than of pointers. In this alterative embodiment the Backlog number associated with an input port is the total number of cells in the Class II FIFO output queues which were received into the switch 14, 18 by that input port. Whether all copies or only one copy of any multicast cells are counted in the Backlog number is optional.

The switching element 28 is used in conjunction with link-based dynamic flow control, which is implemented in the IPC Boards 30 and OPC Boards 32, shown in FIG. 5. One type of such flow control is Generic Flow Control (GFC). The GFC realization differs depending on whether the ports are connected to a UNI 16 or NNI 20, and descriptions of both realizations follow.

Generic Row Control at UNI 16 (GFC_U)

Pseudocode listings 3 to 8 describe GFC_U procedures for the controlled (user 12) side of the UNI 16, as set out in ITU Recommendation I.361. Pseudocode listings 9 to 16 describe GFC_U procedures for the controlling (switch 14, 18) side of the UNI 16, as proposed by us. These procedures follow naturally from those at the controlled side, since they must be complementary. We outline the procedures for both the single- and the two-queue case. The same procedures are applicable across an interface at the $S_B$ reference point or $T_B$ reference point.

Where only one Group of Class II connections is supported, the GFC function in controlled equipment has two flags (TRANSMIT and GFC_ENABLE), one credit counter (GO_CNTR), and one parameter register, associated with the credit counter (GO_VALUE). It also maintains two FIFO queues (Uncon_Q and Con_Q, which are the link transmission queues for uncontrolled and controlled cells respectively).

Where both Groups of Class II connections are supported, the GFC function in controlled equipment has three flags (TRANSMIT, GFC_ENABLE and GROUP_SELECT), two credit counters (GO_CNTR_A and GO_CNTR_B), and two parameter registers, one associated with each of the credit counters (GO_VALUE_A and GO_VALUE_B). It also maintains three FIFO queues (Uncon_Q, Con_A_Q and Con_B_Q, which are the link transmission queues for uncontrolled, controlled Group A and controlled Group B cells respectively).

Where only one Group of Class H connections is supported, the GFC function in controlling equipment maintains three FIFO queues (Uncon_R_Buf and Con_R_Buf, which are the link received buffers for uncontrolled and controlled cells respectively; and Out_Q, which is the link transmission queue).

Where both Groups of Class II connections are supported, the GFC function in controlling equipment has a flag (GROUP_SELECT), and maintains four FIFO queues (Uncon_R_Buf, Con_A_R_Buf and Con_B_R_Buf, which are the link received buffers for uncontrolled, controlled Group A and controlled Group B; and Out_Q, which is the link transmission queue).

Maintaining separate queues throughout for uncontrolled cells and controlled cells makes service and service quality on Class I (uncontrolled) connections independent of traffic on Class II (controlled) connections. Only a single link transmission queue (Out_Q), used for all traffic, is required in controlling equipment, however, because current GFC_U procedures do not provide for the user 12 to control traffic flowing from the switch 14, 18. Hence, any cell 22 transferred from the switching element 28 in a switch 14, 18 to an OPC Board 32 connected to a UNI 16 will be transmitted onto the link in the same cell period. Out_Q will never queue more than single cell, so separate queueing of the Classes is unnecessary.

Listing 3:

```
#define SET 1
#define RESET 0
process_receive_a_uni_ctrld( )
/* PSEUDOCODE */
/* Annex B, I.361 RECEIVE Process of GFC_Function at UNI */
/* Controlled Side */
/* Only Group A supported */
/* Version 3.1 Nov 1994 */
{
    TRANSMIT = SET;
    GO_CNTR = RESET;
    GFC_ENABLE = PESET;
    do
    {
        Await CELL from PHY SAP;
        if (GFC_ENABLE != SET)
        {
            if (GFC != '0000')
            {
                GFC ENABLE = SET;
                LM_Sig(GFC_ENABLE);
                /* Signal sent to ATMM Entity that GFC_ENABLE
                is set */
            }
        }
        if (GFC_ENABLE == SET)
        {
            if (GFC == '1XXX')
                TRANSMIT = RESET;
            else
                TRANSMIT = SET;
            if (GFC == 'X1XX')
                GO_CNTR = GO_VALUE;
        }
        Relay CELL to ATM Entity;
    } while(1);/* Loop indefinitely */
}
```

Listing 4:

```
#define SET 1
#define RESET 0
process_tx_store_a_uni_ctrld( )
/* PSEUDOCODE */
/* Annex B, I.361 TX_STORE Process of GFC_Function at UNI */
/* Controlled Side */
/* Only Group A supported */
/* Version 3.2 May 1995 */
{
    do
    {
        Await CELL from PHY SAP;
        if (GFC_ENABLE != SET)
        {
            if (CELL on uncontrolled connection)
            {
                GFC = '0000';
                Place CELL in Uncon_Q;
            }
            else
                LM_Sig(Invalid_Class);
        }
        else
        {
            if (CELL on uncontrolled connection)
            {
                GFC = '0001';
                Place CELL in Uncon_Q;
            }
            else
            {
                if (CELL on controlled connection)
                {
                    GFC = '0101';
                    Place CELL in Con_Q;
                }
                else
                    LM_Sig(Invalid_Cell);
            }
        }
    } while(1);/* Loop indefinitely */
}
```

Listing 5:

```
#define SET 1
#define RESET 0
process_transmit_a_uni_ctrld( )
/* PSEUDOCODE */
/* Annex B, I.361 TRANSMIT Process of GFC_Function at UNI */
/* Controlled Side */
/* Only Group A supported */
/* Version 3.1 Nov 1994 */
{
    do
    {
        Await LM_Sig(C_Start);
        /* LM_Sig(C_Start) indicates that PHY layer is ready for
           next cell */
        if (TRANSMIT == SET)
        {
            if (Uncon_Q not empty)
            {
                Take CELL from Uncon_Q;
                Transmit CELL to PHY SAP;
            }
            else
            {
                if ((GO_CNTR > 0) && (Con_Q not empty))
                {
                    Take CELL from Con_Q;
                    Transmit CELL to PHY SAP;
                    GO_CNTR--; /* decrement */
                }
```

-continued

```
            }
        }
    } while(1);/* Loop indefinitely */
}
```

Listing 6:

```
#define SET 1
#define RESET 0
process_receive_ab_uni_ctrld( )
/* PSEUDOCODE */
/* Annex B, I.361 RECEIVE Process of GFC_Function at UNI */
/* Controlled Side */
/* Group A and Group B supported */
/* Version 3.2 Mar 1995 */
{
    TRANSMIT = SET;
    GO_CNTR_A = RESET;
    GO_CNTR_B = RESET;
    GFC_ENABLE = RESET;
    do
    {
        Await CELL from PHY SAP;
        if (GFC_ENABLE != SET)
        {
            if (GFC != '0000')
            {
                GFC_ENABLE = SET;
                LM_Sig(GFC_ENABLE);
                /* Signal sent to ATMM Entity that GFC_ENABLE
                   is set */
            }
        }
        if (GFC_ENABLE == SET)
        {
            if (GFC == '1XXX')
                TRANSMIT = RESET;
            else
                TRANSMIT = SET;
            if (GFC = 'X1XX')
                GO_CNTR_A = GO_VALUE_A;
            if (GFC == 'XX1X')
                GO_CNTR_B = GO_VALUE_B;
            /* GO_VALUE_A and GO_VALUE_B set
               by ATMM Entity */
        }
        Relay CELL to ATM Entity;
    } while(1); /* Loop indefinitely */
}
```

Listing 7:

```
#define SET 1
#define RESET 0
process_tx_store_ab_uni_ctrld( )
/* PSEUDOCODE */
/* Annex B, I.361 TX_STORE Process of GFC_Function at UNI */
/* Controlled Side */
/* Group A and Group B supported */
/* Version 3.2 May 1995 */
{
    do
    {
        Await CELL from PHY SAP;
        if (GFC_ENABLE != SET)
        {
            if (CELL on uncontrolled connection)
            {
                GFC = '0000';
                Place CELL in Uncon_Q;
            }
            else
```

```
            LM_Sig(Invalid_Class);
    }
    else
    {
        if (CELL on uncontrolled connection)
        {
            GFC = '0001';
            Place CELL in Uncon_Q;
        }
        else
        {
            if (CELL on controlled connection Group A)
            {
                GFC = '0101';
                Place CELL in Con_A_Q;
            }
            else
            {
                if (CELL on controlled connection Group B)
                {
                    GFC = '0011';
                    Place CELL in CON_B_Q;
                }
                else
                    LM_Sig(Invalid_Cell);
            }
        }
    } while(1);/* Loop indefinitely */
}
```

Listing 8:

```
#define SET 1
#define RESET 0
#define OR ||
process_transmit_ab_uni_ctrld( )
/* PSEUDOCODE */
/* Annex B, I.361 TRANSMIT Process of GFC_Function at UNI */
/* Controlled Side */
/* Group A and Group B supported */
/* Version 3.1 Nov 1994 */
{
        GROUP_SELECT = SET;
        do
        {
            Await LM_Sig(C_Start);
            /* LM_Sig(C_Start) indicates that PHY layer is ready for next cell */
            if (TRANSMIT == SET)
            {
                if (Uncon_Q not empty)
                {
                    Take CELL from Uncon_Q;
                    Transmit CELL to PHY SAP;
                }
                else
                    procedure_transmit controlled_cell( );
            }
        } while(1); /* Loop indefinitely */
}/*end of process_transmit_a_uni*/
procedure_transmit_controlled_cell( )
{
        if ((Con_A_Q not empty) && (GO_CNTR_A != 0) &&
        ((GROUP_SELECT == SET) OR (Con_B_Q empty) OR (GO_CNTR_B == 0)))
        {
            Take CELL from Con_A_Q;
            Transmit CELL to PHY SAP;
            GO_CNTR_A--; /* decrement */
        } /* GROUP_SELECT being SET gives preference to Group A */
        else
        {
            if ((Con_B_Q not empty) && (GO_CNTR_B != 0))
            {
                Take CELL from Con_B_Q;
                Transmit CELL to PHY SAP;
                GO_CNTR_B--; /* decrement */
                /* GROUP_SELECT not SET gives preference to Group B */
            }
        }
        if (GROUP_SELECT == SET)
            GROUP_SELECT = RESET;
        else
            GROUP_SELECT = SET; /* toggle the flag GROUP_SELECT */
}/*end of procedure_transmit controlled_cell*/
```

Listing 9:

```
#define SET 1
#define RESET 0
process_receive_a_uni_ctrlg( )
/* PSEUDOCODE */
/* RECEIVE Process of GFC_Function at UNI */
/* Controlling Side */
/* Only Group A supported */
/* Version 1.0 Apr 1995 */
{
        do
        {
        do
        {
            Await CELL from PHY SAP;
            if (GFC = '000X')
                Store CELL in Uncon_R_Buf;
            else
            {
                if (GFC = '010X')
                    Store CELL in Con_R_Buf;
                else
                    LM_Sig(Cell_discard);
                    /* LM_Sig(Cell_discard) tells Layer Management that cell on */
                    /* controlled ATM connection has been discarded (it had an */
                    /* undefined GFC bit pattern) */
            }
        } while(1);/* Loop indefinitely */
}
```

Listing 10:

```
#define SET 1
#define RESET 0
process_rx_store_a_uni_ctrlg( )
/* PSEUDOCODE */
/* RX_STORE Process of GFC_Function at UNI */
/* Controlling Side */
/* Only Group A supported */
/* Version 1.0 Apr 1995 */
{
    do
    {
        Await LM_Sig(R_Start, Stop);
        /* LM_Sig(R_Start, Stop) is layer management signal */
        /* signifying start of cell Relay period. Parameter STOP */
        /* signifies that no cell on controlled ATM connection may be */
        /* sent into Relay/Switch in that Relay period */
        if (Uncon_R_Buf not empty)
        {
            Take CELL from Uncon_R_Buf;
            Send CELL to Relay/Switch;
        }
        else
        {
            if (STOP != SET) && (Con_R_Buf not empty))
            {
                Take CELL from Con_R_Buf;
                Send CELL to Relay/Switch;
            }
        }
    } while(1);/* Loop indefinitely */
}
```

Listing 11:

```
#define SET 1
#define RESET 0
process_tx_store_ab_uni_ctrlg( )
/* PSEUDOCODE */
```

-continued

```
/* TX_STORE Process of GFC_Function at UNI */
/* Controlling Side */
/* Group A & Group B supported */
/* Version 1.1 May 1995 */
{
    do
    {
        Await CELL from Relay/Switch;
        Place CELL in Out_Q;
    } while(1);/* Loop indefinitely */
}
Listing 12:
#define SET 1
#define RESET 0
process_transmit_a_uni_ctrlg( )
/* PSEUDOCODE */
/* TRANSMIT Process of GFC_Function at UNI */
/* Controlling Side */
/* Only Group A supported */
/* Version 1.1 May 1995 */
{
    do
    {
        Await LM_Sig(C_Start);
        /* LM_Sig(C_Start) indicates that PHY layer
        is ready for next cell */
        if (Out_Q not empty)
            Take CELL from Out_Q;
        else
            Make up Unassigned CELL;
        if (STOP == SET)
            GFC = '0000';
        else
            GFC = '0100';
        Transmit CELL to PHY SAP;
    } while(1);/* Loop indefinitely */
}
```

Listing 13:

```
#define SET 1
#define RESET 0
process_receive_ab_uni_ctrlg( )
/* PSEUDOCODE */
/* RECEIVE Process of GFC_Function at UNI */
/* Controlling Side */
/* Group A & Group B supported */
/* Version 1.0 Apr 1995 */
{
    do
    {
        Await CELL from PHY SAP;
        if (GFC = '000X')
            Store CELL in Uncon_R_Buf;
        else
        {
            if (GFC = '010X')
                Store CELL in Con_A_R_Buf;
            else
            {
                if (GFC = '001X')
                    Store CELL in Con_B_R_Buf;
                else
                    LM_Sig(Cell_discard);
                    /* LM_Sig(Cell_discard) tells Layer Management that cell on */
                    /* controlled ATM connection has been discarded (it had an */
                    /* undefined GFC bit pattern) */
            }
        }
    } while(1);/* Loop indefinitely */
}
```

Listing 14:

```
*define SET 1
*define RESET 0
*define OR ||
process_rx_store_ab_uni ctrlg( )
/* PSEUDOCODE */
/* RX_STORE Process of GFC_Function at UNI */
/* Controlling Side */
/* Group A & Group B supported */
/* Version 1.0 Apr 1995 */
{
        GROUP_SELECT = SET;
        do
        {
            Await LM_Sig(R_Start, Stop_A, Stop_B);
            /* LM_Sig(R_Start, Stop_A, Stop_B) is layer management signal */
            /* signifying start of cell Relay period. The parameters */
            /* STOP_A and STOP_B signify that no cell on controlled ATM */
            /* connections of Group A and B respectively may be sent into */
            /* Relay/Switch in that Relay period */
            if (Uncon_R_Buf not empty)
            {
                Take CELL from Uncon_R_Buf;
                Send CELL to Relay/Switch;
            }
            else
                procedure_rx_store_controlled_cell( );
        } while(1);/* Loop indefinitely */
}/*end of process_rx_store_ab_uni_ctrlg*/
procedure_rx_store_controlled_cell( )
{
        if ((Con_A_R_Buf not empty) && (STOP_A != SET) &&
        ((GROUP_SELECT == SET) OR (Con_B_R_Buf empty) OR (STOP_B == SET)))
            Take CELL from Con_A_R_Buf;
            Send CELL to Relay/Switch;
        } /* GROUP_SELECT being SET gives preference to Group A */
        else
        {
```

-continued

```
        if ((Con_B_R_Buf not empty) && (STOP_B != SET))
        {
            Take CELL from Con_B_R_Buf;
            Send CELL to Relay/Switch;
            /* GROUP_SELECT not SET gives preference to Group B */
        }
    }
        if (GROUP_SELECT == SET)
        GROUP_SELECT = RESET;
    else
        GROUP_SELECT = SET; /* toggle the flag GROUP_SELECT */
}/*end of procedure_rx_store controlled_cell*/
```

Listing 15:

```
*define SET 1
*define RESET 0
process_tx_store_ab_uni_ctrlg( )
/* PSEUDOCODE */
/* TX_STORE Process of GFC Function at UNI */
/* Controlling Side */
/* Group A & Group B supported */
/* Version 1.1 May 1995 */
{
    do
    {
        Await CELL from Relay/Switch;
        Place CELL in Out_Q;
    } while(1);/* Loop indefinitely */
}
Listing 16:
#define SET 1
#define RESET 0
process_transmit_ab_uni_ctrlg( )
/* PSEUDOCODE */
/* TRANSMIT Process of GFC_Function at UNI */
/* Controlling Side */
/* Group A & Group B supported */
/* Version 1.1 May 1995 */
{
    do
    {
        Await LM_Sig(C_Start);
        /* LM_Sig(C_Start) indicates that PHY layer is
        ready for next cell */
        if (Out_Q not empty)
            Take CELL from Out_Q;
        else
            Make up Unassigned CELL;
        Force first bit (MSB) of GFC to be 0;
        Force second bit of GFC to !STOP_A;
        Force third bit of GFC to be !STOP_B;
        Force fourth bit (LSB) of GFC to be 0;
        Transmit CELL to PHY SAP;
    } while(1);/* Loop indefinitely */
}
```

Generic Flow Control at NNI 20 (GFC_N)

Pseudocode listings 17 to 20 describe GFC_N procedures, as proposed by us.

Generic flow control at NNI 20 is similar, though not identical to the GFC at UNI 16. As at UNI 16, the control is in relation only to aggregate traffic on controlled ATM connections, and absolute priority is given to traffic on uncontrolled connections. The GFC_N function is controlled by its peer at the other end of the link with respect to traffic on controlled connections that it sends out on the link and is also controlled by the relay/switch 14, 18 with respect to traffic on controlled connections that it sends to the switch 14. 18. GFC_N controls its peer function as well as the relay/switch 14, 18 with respect to traffic on controlled connections that these send to it. GFC_N sends all permitted traffic in FIFO order.

The GFC_N function has two up-down positive integer counters GO_CNTR and CQ. On start-up Go_CNTR is set to GO_VALUE and CQ is reset. GO_VALUE is a parameter fixed by Management. It will maintain two buffers for cells 22 received from PHY SAP, Uncon_R_Buf for cells on uncontrolled connections and Con_R_Buf for cells on controlled connections. These are the link received buffers. It will also maintain two buffers for cells 22 to be on link, Uncon_Q for uncontrolled cells and Con_Q for controlled cells. These are the link transmission queues. Con_Q will have room for one cell 22 only, and when this queue is occupied the OPC signals to the switching element that it will not accept another Class II cell.

Listing 17:

```
#define SET 1
#define RESET 0
process_receive_nni( )
/* PSEUDOCODE */
/* RECEIVE Process of GFC_Function at NNI */
/* Version 1.0 Feb 1995 */
{
    do
    {
        Await CELL from PHY SAP;
        if (GFC == SET)
            GO_CNTR++; /* increment */
        if (CELL Assigned)
        {
            if (CELL Controlled)
                Store CELL in Con_R_Buf;
            else
                Store CELL in Uncon_R_Buf;
        }
    } while(1); /* Loop indefinitely */
}
```

Listing 18:

```
#define SET 1
#define RESET 0
process_rx_store_nni( )
/* PSEUDOCODE */
/* RX_STORE Process of GFC_Function at NNI */
/* Version 1.0 Feb 1995 */
{
    CQ = RESET;
    do
    {
        Await LM_Sig(R_Start, Stop);
        /* LM_Sig(R_Start, Stop) is layer management signal */
        /* signifying start of cell Relay period. Parameter STOP */
```

```
/* signifies that no cell on controlled ATM connections may be */
/* sent into Relay/Switch in that Relay period */
if (Uncon_R_Buf not empty)
{
    Take CELL from Uncon_R_Buf;
    Send CELL to Relay/Switch;
}
else
{
    if ((STOP != SET) && (Con_R_Buf not empty))
    {
            Take CELL from Con_R_Buf;
            Send CELL to Relay/Switch;
            CQ++;/* increment */
    }
    }
} while(1);/* Loop indefinitely */
}
```

Listing 19:

```
#define SET 1
#define RESET 0
process_tx_store_nni( )
/* PSEUDOCODE */
/* TX_STOPE Process of GFC_Function at NNI */
/* Version 1.1 Mar 1995 */
{
    do
        Await CELL from Relay/Switch;
        if (CELL on uncontrolled connection)
            Place CELL in Uncon_Q;
        else
        {
            if (Con_Q empty)
            {
                Place CELL in Con_Q;
                LM_Sig(C_Q_occ);
                /* LM_Sig(C_Q_occ) tells Layer Management that Con_Q is occupied */
            }
            else
                LM_Sig(Cell_discard);
                /* LM_Sig(Cell discard) tells Layer Management that cell on */
                /* controlled ATM connection has been discarded (it had been */
                /* incorrectly sent since Con_Q was occupied and has room for one */
                /* cell only) */
        }
    } while(1);/* Loop indefinitely */
}
```

Listing 20:

```
#define SET 1
#define RESET 0
process_transmit_nni( )
/* PSEUDOCODE */
/* TRANSMIT Process of GFC_Function at NNI */
/* Version 1.0 Feb 1995 */
{
    GO_CNTR = GO_VALUE;
    do
    {
        Await LM_Sig(C_Start);
        /* LM_Sig(C_Start) indicates that PHY layer is ready for next cell */
        if (Uncon_Q not empty)
            Take CELL from Uncon_Q;
        else
        {
            if ((Go_CNTR > 0) && (Con_Q not empty))
            {
                Take CELL from Con_Q;
                GO_CNTR--; /* decrement */
                LM_Sig(C_Q_free);
                /* LM_Sig(C_Q_free) tells Layer Management that Con_Q is free */
            }
            else
                Make up Unassigned CELL;
```

-continued

```
    }
    if (CQ > 0)
    {
        GFC = SET;
        CQ--;/* decrement */
    }
    else
        GFC = RESET;
    Transmit CELL to PHY SAP;
  } while(1); /* Loop indefinitely */
}
```

Buffer Store Requirement

The size of buffer required in the IPC Boards 30 shown in FIG. 5, due to the GFC function depends on the length of the link, or more precisely the round trip delay on the link, and may be substantial. The procedure proposed for the GFC at NNI 20 differs from the procedure at UNI 16 for the very reason of making the buffer requirement as small as possible and, moreover, definable by a parameter under management control, and not left directly dependent on the actual physical delay on the link. (Such dependence on physical delay is harmless at UNI 16 where links are short and the buffer can be made considerably larger than the minimum required.)

The difference is in the procedure associated with the GO_CNTR which can be seen to be in the two cases as follows.

At UNI 16:

Initial value of GO_CNTR=0

On receipt of SET, GO_CNTR:=GO_VALUE

On sending of controlled cell, GO_CNTR:=GO_CNTR−1

At NNI 20:

Initial value of GO_CNTR:=GO_VALUE

On receipt of GFC=1, GO_CNTR:=GO_CNTR+1

On sending of controlled cell, GO_CNTR:=GO_CNTR−1.

Thus at NNI 20, as proposed, flow control is in effect based on a credit window of width GO_VALUE. At UNI 16 it is based on recurrent credit advances, each advance restoring the credit holding to GO_VALUE. The GO_VALUE parameter has obviously a different significance in the two cases, with different effects on minimum required size of buffer.

The buffer requiring a size of any substance is at the receiving end of the controlled traffic. Thus at the NNI 20 it is the buffer Con_R_Buf. At the UNI 16 the equivalent of Con_R_Buf exists only in the controlling equipment and therefore is not named i the procedures defined for the controlled equipment.

With the GFC procedure proposed at NNI 20, the minimum required size for Con_R_Buf is exactly equal to GO_VALUE. Given that size, there is no possibility of overflow. The minimum size of GO_VALUE itself is determined by considering the percentage of link capacity that can be made available to controlled traffic. If 100 per cent of the capacity is to be made available, then the GO_VALUE has to be at least equal to the round trip delay (RTD) on the link, expressed as number of cell periods at the link rate. With GO_VALUE<RTD, the maximum percentage of link capacity that can be available to controlled traffic is (GO_VALUE/RTD)×100.

With the GFC procedures at UNI 16, the required minimum buffer at the controlling end is (T+GO_VALUE+RTD), where T is threshold fill of the buffer above which the controlling end sends to the controlled end NULLs instead of SETs, and RTD is again the round-trip delay on the link expressed in number of cells. To make 100 per cent of link capacity available to controlled traffic, the sum (T+GO_VALUE) must be at least equal to RTD. With a smaller value, the available percentage of link capacity is ((T+GO_VALUE)/RTD)×100. The GO_VALUE in itself is not required to be of any size larger than unity which is the default value specified for it by the Recommendation.

Thus, for a given RTD, the minimum buffer required is larger by at least a factor of two with the GFC procedure at UNI 16 than with the proposed procedure at NNI 20. A buffer requirement equal to RTD is in fact the smallest possible, consistent with controlled flow and 100 per cent link utilization. Even more important than the lesser buffer requirement, is the fact that it is not directly tied to the physical delay on the link, but to a chosen parameter. This gives the freedom to trade buffer requirement against percentage of link capacity made available to controlled traffic. That may be of considerable practical advantage when dealing with very long, e.g. transoceanic, links.

The claims defining the invention are as follows:

1. A method for controlled transfer of some or all traffic across an asynchronous transfer mode (ATM) network, said traffic including Class II cells, where Class II cells by definition are ATM cells that enter and flow across said ATM network on unresourced ATM virtual connections, said ATM network comprising a plurality of ATM switches coupled by links providing communication channels between said switches, each link having a sending end coupled to one of said switches from which a cell is sent and a receiving end coupled to another one of said switches which receives ea cell, each switch including a switching element having a switch buffer and, a plurality of inputs and outputs communicating with said switching element, each input having an associated input buffer, said method comprising the steps of:

(a) sending a Class II cell on a particular link only when assurance exists at said sending end of said particular link of loss-free transfer of the cell to said input buffer at a switch at said receiving end of said link, thereby assuring loss-free transfer of Class II cells from switch to switch;

(b) on arrival of a Class II cell at said input port of said switch at said receiving end of said link, placing said Class II cell in said input buffer of said input port, and (c) transferring said Class II cell from said input buffer of said input port of said switch at said receiving end to said switch buffer of said switch at said receiving end when, and only when, allowed to be so transferred by regulation, said regulation based on a count of Class II cells previously transferred from said input buffer to said switch buffer and not yet output from said switch at said receiving end of said link.

2. The method according to claim 1, where said traffic is comprised of both Class I and Class II cells, where Class I cells by definition are ATM cells that enter and flow across said ATM network on resourced ATM virtual connections, said method further comprising the steps of:

(d) on arrival of a Class I cell at a switch input port of said switch at said receiving end of said link, transferring said Class I cell directly to said switching element of said switch at said receiving end, while on arrival of a Class II cell at said input port of said switch at said receiving end of said link, placing said Class II cell in said input buffer of said input port, (e) at each read-out opportunity of said output port of said switch at said receiving end, reading out from said switching element a Class I cell that is destined for said output port if any such Class I cell is present, and, (f) when and only when there are no Class I cells stored in said switching element of said switch at said receiving end of said link that are destined for a particular output port, at a read-out opportunity for that output port, reading out a Class II cell destined for that port, if any exist and provided said output port will accept a Class II cell for transmission over the link.

3. A method according to claim 2, in which the said switch buffer is in the said switching element of each ATM switch comprises a common shared memory and in which each switch also includes an input port controller (IPC Board) and an output port controller (OPC Board) associated with each output, said method further comprising the steps of:

storing all cells accepted by said switching element in said common shared memory;

providing as part of the said switching element a Class I first-in-first-out (FIFO) queue and a Class II FIFO queue for each output port for holding pointers for Class I and Class II cells respectively destined for that output port and stored in said common shared memory at the time a cell is accepted by said switching element, appending a pointer to said Class I and Class II cells to said Class I FIFO queue or Class II FIFO queue, as the case may be, for the output port or output ports for which said cell is destined;

at every said read-out opportunity for a particular output port, reading out the next pointer from said Class I queue, unless it is empty, in which case, provided the said OPC Board for that output will accept a said Class II cell, reading out the next pointer from said Class II queue, unless it is empty;

given a said pointer, reading the cell from the pointed location in the said common shared memory, and outputting the said cell to the said OPC Board associated with the said output port; and when a cell has been read by an output, or in the case of a multicast cell when it has been read by all concerned outputs, returning its location to the pool of free locations in the said common shared memory.

4. A method according to claim 3 further comprising the steps of:

setting a quota of locations in said common shared memory or each input port;

maintaining a count of the number of Class II cells in said common shared memory which arrived at said input port;

comparing said count with said quota once every cell period; and whenever said comparison shows that said count is equal to or greater than said quota sending a Stop signal to said IPC Board, by which said IPC controls the transferral of Class II cells from the said IPC Board to the said switching element.

5. A method according to claim 4 further comprising the step of decrementing said count of the number of locations in common shared memory occupied by Class II cells which arrived at a particular input port whenever the location of a said Class II cell which arrived at said input port is returned to the pool of free locations in the said common shared memory.

6. A method according to claim 4, wherein the quota for at least one input port is different to the quota for the remaining input ports for a particular switching element.

7. A method according to claim 4, wherein the input port quotas can be independently varied during the operation of the switch.

8. A method according to claim 2 further comprising the steps of:

providing as part of the said switching element a Class I first-in-first-out (FIFO) queue and a Class II FIFO queue for each output port for holding Class I and Class II cells respectively destined for that output port;

at the time a cell is accepted by said switching element, appending said Class I and Class II cells to said Class I FIFO queue or Class II FIFO queue, as the case may be, for the output port or output ports for which said cell is destined;

at every said read-out opportunity for a particular output port, reading out the next cell from said Class I queue, unless it is empty, in which case, provided the said OPC for that output will accept a said Class II cell, reading out the next cell from said Class II queue, unless it is empty; and given a said cell, dequeueing and outputting it to the said OPC Board associated with the said output port.

9. A method according to claim 8 further comprising the steps of:

setting a cell quota for each input port;

maintaining a count of the total number of cells in the Class II FIFO output queues which arrived at said input port, where the count may include all copies of a Class U multicast cell, or may include only one of the copies of said multicast cell;

comparing said count with said quota once every cell period; and whenever said comparison shows that said count is equal to or greater than said quota sending a Stop signal to said IPC Board, by which said EPC controls the transferral of Class U cells from the said IPC Board to the said switching element.

10. A method according to claim 9 further comprising the step of decrementing said count of the number of Class II cells which arrived at a particular input port whenever a said Class H cell which arrived at said input port is read out of a Class II FIFO output queue, and where in the case of a multicast Class II cell, the count is decremented every time a copy of the said multicast cell is read out of a FIFO output queue, or only once when the last remaining copy in the switch of the said multicast cell is read out of a FIFO output queue, consistent with the manner of counting said Class II multicast cells.

* * * * *